United States Patent
Luo et al.

(10) Patent No.: US 7,425,779 B2
(45) Date of Patent: Sep. 16, 2008

(54) PARALLEL REDUNDANT POWER SYSTEM AND THE CONTROL METHOD FOR THE SAME

(75) Inventors: Han-Sheng Luo, Baoan Shenzhen (CN); Shou-Long Tian, Baoan Shenzhen (CN); Chia-Ming Tsai, Yung-He (TW)

(73) Assignee: Phoenixtec Power Co., Ltd., Taipei (TW)

( * ) Notice: Subject to any disclaimer, the term of this patent is extended or adjusted under 35 U.S.C. 154(b) by 0 days.

(21) Appl. No.: 11/507,425

(22) Filed: Aug. 21, 2006

(65) Prior Publication Data

US 2006/0293798 A1 Dec. 28, 2006

Related U.S. Application Data

(62) Division of application No. 10/677,833, filed on Oct. 2, 2003, now abandoned.

(51) Int. Cl.
*H02J 3/00* (2006.01)
(52) U.S. Cl. ...................................................... 307/82

(58) Field of Classification Search .................. 307/82
See application file for complete search history.

(56) References Cited

U.S. PATENT DOCUMENTS 5,257,180 A    10/1993   Sashida et al.
5,712,540 A *  1/1998    Toda et al. .................. 318/46

* cited by examiner

*Primary Examiner*—Michael J Sherry
*Assistant Examiner*—Dru M Parries
(74) *Attorney, Agent, or Firm*—William E. Pelton, Esq.; Cooper & Dunham LLP (57) ABSTRACT

A power redundant power system and a method for controlling the power system are presented, wherein the power system is composed of at least one inverter for supplying AC power to a load through a bus, a phase lock system to synchronize all output voltages of the inverters and a current sharing circuit to properly distribute the load current among all inverters. Each inverter is controlled by an unbalanced power to limit the increase of its cross current. Moreover, the information related to DC bus voltage is further applied to control the inverters, whereby the cross current is mitigated and entire power system is operated steadily.

2 Claims, 7 Drawing Sheets

PARALLEL REDUNDANT POWER SYSTEM AND THE CONTROL METHOD FOR THE SAME

CROSS-REFERENCE TO RELATED APPLICATIONS

This is a divisional application of U.S. patent application Ser. No. 10/677,833 filed Oct. 2, 2003 now abandoned.

BACKGROUND OF THE INVENTION

1. Field of the Invention

The present invention is related to a parallel redundant power system and the control method for the same, and more particularly to a power system that utilizes an unbalanced power calculation and a cross current limitation technique to control the response of the inverter.

2. Description of Related Arts

With the almost total dependence of modern societies on electricity for employment, living, communication and entertainment, any disruption to an electricity supply brings about a temporary halt to civilization as we know it. Especially in the present age where a breathtaking variety of electronic products are widely used, serious economic loss may possibly occur if a company loses critical data when the electricity supply is suddenly interrupted.

To solve the above problem, the uninterruptible power supply (UPS) has been developed for providing a stable power supply. The most important objective of the UPS is to continuously supply stable power to the load even when the input line voltage experiences unusual and damaging situations. Therefore, the reliability of the UPS is very important when the UPS is adopted as the protective power supply source. In the actual environment, the UPS may face many difficult problems, for example the fluctuation of the input voltage, thunderstorm interference, the sudden change of the load (the load may even short), and the continuous operation for twenty-four hours a day. For the common on-line UPS, the reliability may reach 99.9% while the manufacturing cost is in the acceptable range for the fabricators. However, if the manufacturer intends to improve the reliability to be higher, not only will the circuit become more complex, but also the cost will also be greatly increased. Therefore, under the premise that there should not be much increase in the cost, designers have utilized a single UPS to accomplish a redundant power supply system to improve the reliability, as disclosed in U.S. Pat. No. 5,257,180. It should be noted that the cited patent is directed to inverters, not to a UPS.

There is no doubt that the reliability of these inverters will be improved by implementation, however, most of the control means for the power supply system is accomplished by hardware, so the gain of the controllers is unable to be modified and thus the transient (dynamic) response of the power supply system is difficult to handle. The analyses of the cross current and the parallel operation disclosed by the cited patent utilizes a virtual vector, wherein the virtual vector may even be further divided into two components (vectors). However, the amplitude difference and the phase difference among the inverters caused by the difference of the inverter impedances is not of concern here. The method taught by the cited patent is so complex that a high reliability may not be obtained and the fabrication cost is increased to a non-commercially.

Furthermore, if the inverter is used as an adaptive inverter for the UPS, the cited patent does not take into account the input DC voltage of the inverter from the bus, and the influence generated while the inverter is coupled to any other module is also not considered either. Moreover, the synchronizing signal of the patent is supplied from external circuits. Once the synchronize signal experiences failure, the entire power system will breakdown.

SUMMARY OF THE INVENTION

The main objective of the present invention is to provide a parallel power system capable of controlling current sharing. When the power system experiences abnormal situations such as the current surge, a non-linear load or a short circuit, the gain value of the controller is instantly adjusted. Moreover, the cross current is controlled by utilizing a concept of power balance while the output impedance is simultaneously considered without separating the cross current into two vectors, so that the power system possesses superior reliability.

To achieve the main objective, the parallel power system is composed of plural UPS modules each of which having an inverter, wherein the outputs of the inverters are coupled in parallel to supply the power to a load through a bus. Moreover, the power system further comprises a current sharing circuit, a synchronizing clock signal circuit and a communication circuit coupled among the UPS modules, wherein the synchronizing clock signal circuit controls the phases of all output voltages of the inverters to be synchronal to each other;

wherein the current sharing circuit controls the current rate that each UPS module should output, and furthermore by properly controlling the unbalanced power among the UPS modules, the cross current could be mitigated; and wherein the communication circuit is used to control information exchange among the parallel UPS modules.

The above current sharing circuit further includes a switching element that allows a single inverter to be operated independently.

A second objective of the present invention is to provide a method for controlling a power system composed of plural parallel UPS modules, wherein a current sharing signal is used to calculate the unbalanced power provided to control the ratio of load current sharing among the UPS modules, the method comprises the steps of:

sampling an output voltage of one UPS module, a load current value of the UPS module and the current sharing signal during a cycle;

calculating a difference value by comparing the sampled load current value with the current sharing signal;

multiplying the sampled output voltage by the calculated load current difference value to obtain a product value and then dividing the product value by the cycle to obtain an average value, wherein the average value represents an unbalanced power parameter; and controlling the active power by adjusting the output voltage of the UPS module based on the unbalanced power.

The foregoing control method also could adopts the DC bus voltage to compensate the active power. The compensation is performed by utilizing a difference value between the detected DC bus voltage and a preset DC bus voltage. The compensation is referred to as a DC bus voltage compensation loop.

A further objective of the present invention is to provide a method for improving the cross current transient by adding a compensation from the instant difference between a load current detector and a share current circuit to the inner current control loop. The compensation is implemented by the following steps: sampling an instant load current value of the UPS module and the current sharing signal;

calculating a difference value by comparing the sampled instant load current value with the current sharing signal; and multiplying the difference value with a gain value to obtain a compensation value to add to the inner current loop so as to improve the cross current transient of the load sharing.

DETAILED DESCRIPTION OF THE PREFERRED EMBODIMENT

For a preferred embodiment of the present invention, a parallel (N+1) redundant power system utilizes a digital signal processor (DSP) as a controller applied to an on-line type UPS module, wherein an inverter of the UPS module is a half-bridge topology.

Figure 1:
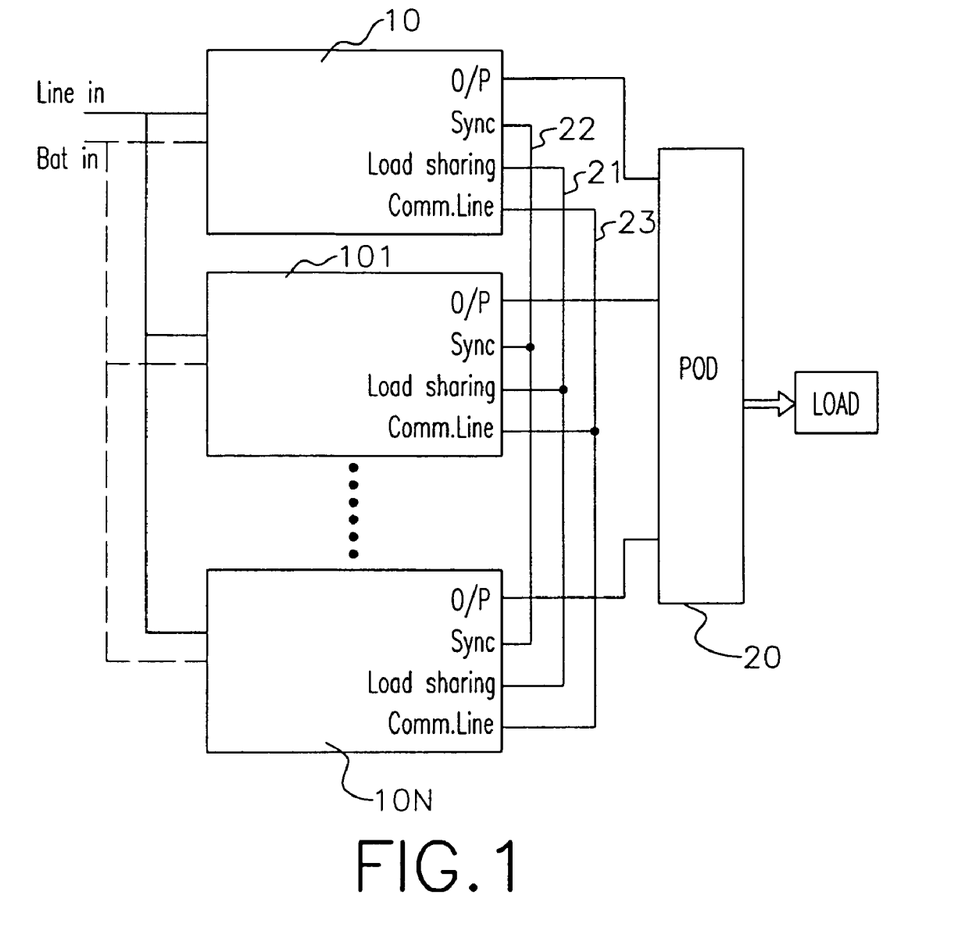
FIG. 1 is a block diagram of a parallel redundant power system composed of plural UPS modules in accordance with the present invention.

With reference to FIG. 1, the parallel redundant UPS system is composed of plural UPS modules (10)(101-10N) connected in parallel. If the output power of each UPS module (10)(101-10N) is high, all the UPS modules (10)(101-10N) are coupled through a power output distributor (POD)(20) to supply the composed power to the load. Otherwise, if the output power of each UPS module (10)(101-10N) is low, all the UPS modules (10)(101-10N) can coupled together via lines and then they collectively provide the power to the load without the use of the POD (20).

In order to perform a by-pass path (bypass function), all the UPS modules (10)(101-10N) are coupled to the AC input line voltage (Line in) in parallel. The power system further includes batteries (not shown) to supply power to the load when the AC input voltage is abnormal, wherein whether in the line voltage operation mode or the battery operation mode, all the UPS modules (10)(101-10N) are connected to the common batteries so as to achieve the maximum available backup time. Besides the power lines mentioned above, the power system further has some circuits connected among the UPS modules (10)(101-10N). These circuits include a load sharing current line (21), a synchronizing clock signal line (22) and a communication line (23).

The load sharing current line (21) is provided to exchange information related to the output current among these parallel UPS modules (10)(101-10N), wherein the voltage value measured on the load sharing line (21) represents an average value of all output current values of the UPS modules (10)(101-10N).

The synchronizing clock signal line (22) is used to phase locks all UPS modules (10)(101-10N), whereby all output voltages of the UPS modules (10)(101-10N) have synchronal phases.

The communication line (23) is used to exchange information among the parallel UPS modules (10)(101-10N) whereby the operating status of each individual UPS module (10)(101-10N) can be monitored in real time.

For each UPS module (10)(101-10N) in FIG. 1, the input voltage and the output voltage are both single phase (R-phase) in this embodiment. Moreover, the present invention is able to be applied on a power system with three phase AC input voltage. That is, two additional phases (S-phase and T-phase) are input to the power system, wherein modification of the inverter of each UPS module (10)(101-10N) is not necessary, and the phase-locking circuit and bypass circuit both are still operated based on the R-phase.

Figure 3A:
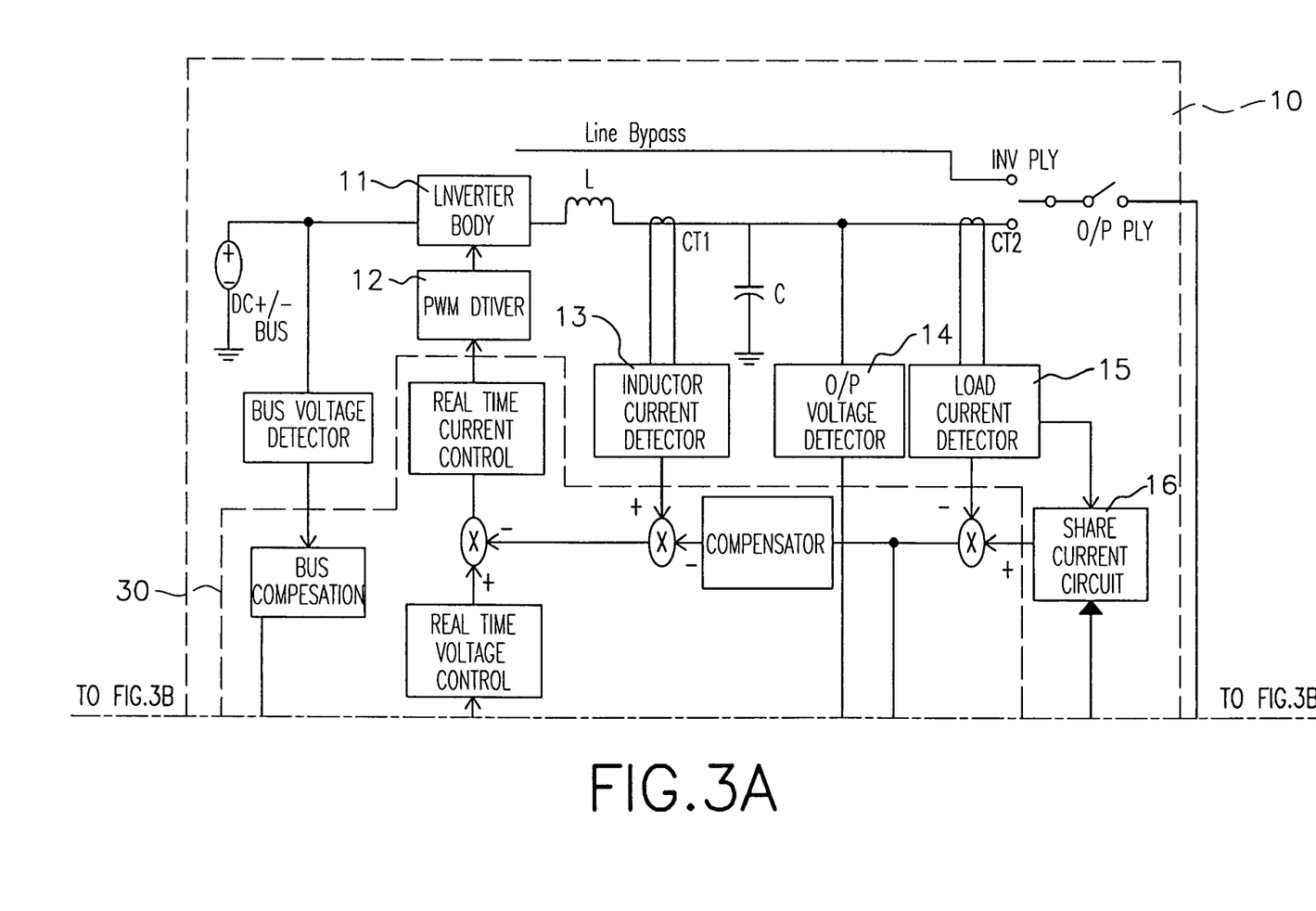
FIGS. 3A-3B are a block diagrams showing a UPS module of FIG. 1 in detail.
Figure 3B:
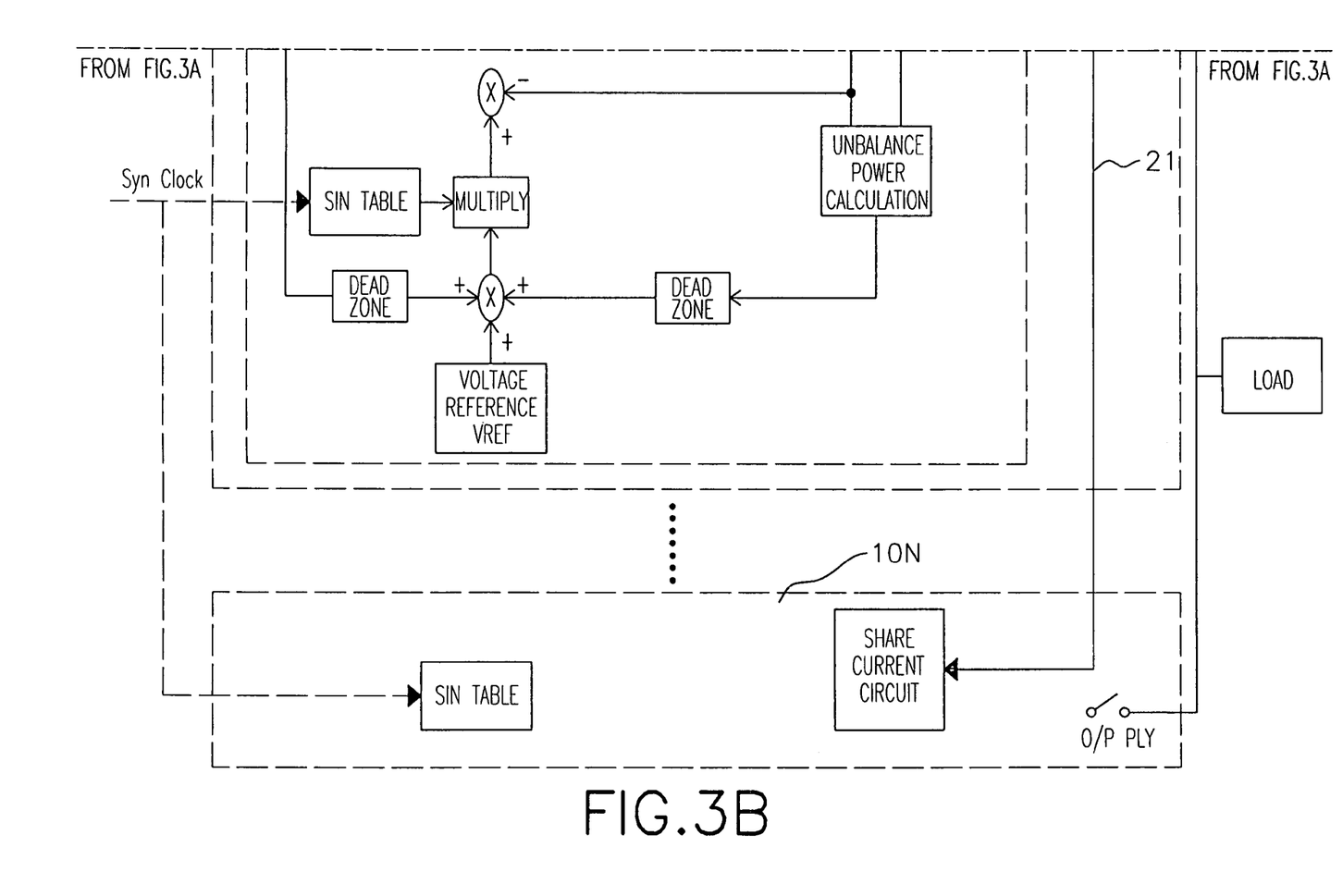

With reference to FIGS. 3A-3B, as an example, only one UPS module (10) of FIG. 1 is illustrated in detail by its functional block diagrams. The UPS module (10) comprises an inverter (11), a PWM driver (12) for driving the inverter (11), an inductor current detector (13) coupled to the output of the inverter (11), an output voltage detector (14), a load current detector (15) and a control unit (30). All the load current detectors (15) of the UPS modules (10)(101-10N) are connected via a current sharing circuit (16) and a current sharing line (21).

The control unit (30) is implemented by a digital signal processor (DSP) with the associated control software programmed therein.

Since most of the parts of the control units (30) of all the UPS modules (10)(101-10N) are implemented by software, each UPS module (10)(101-10N) has the superior flexibility that allows the UPS module to properly adjust its gain parameters based on the different working situations.

The control of a parallel redundant power system is explained from two aspects, the transient (dynamic) control and the static control, wherein the processing frequency of the transient control is higher than that of the static control. Both aspects are explained hereinafter.

A. The Static Control of the Parallel Redundant Power System

A control means is designed inside the control unit (30) to process the static control of the power system, wherein the processing frequency of such a static control is low when comparing with the transient control, for example the controlling process may be executed once per cycle of the output voltage of the UPS module (10).

Figure 2:
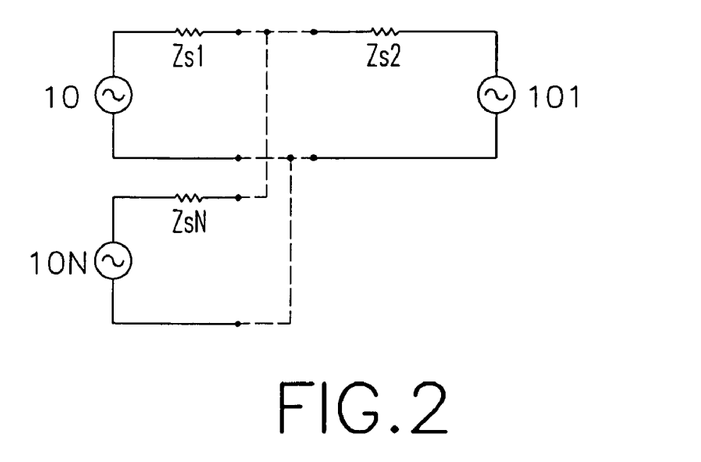
FIG. 2 is an equivalent circuit diagram showing the parallel UPS modules in accordance with the present invention.

With reference to FIG. 2, each UPS module is simulated as an equivalent ideal AC power source connected with an output impedance Zsi (i=1 to N). Because the UPS modules (10)(101-10N) are not matched with other, there are some kinds of differences among the UPS modules (10)(101-10N). These differences are mainly categorized into three types.

(1) The output impedance of each UPS module (10)(101-10N) is not identical to the others.

(2) The phase of each equivalent AC power source (10) (101-10N) is not synchronal with each other.

(3) The amplitude of each equivalent AC power source is not identical with each other.

The three kinds of differences among the UPS modules (10)(101-10N) may incur some problems.

In the condition that the power system is coupled with the load, the output voltage values of the UPS modules (10)(101-10N) are not the same with each other because of the different output impedances among the UPS modules (10)(101-10N). Furthermore, since the impedance of all UPS modules (10)(101-10N) are not identical with each other, the amplitude and phase of the AC output voltage of each UPS module will experience interference. If the output impedance is represented as a resistance, the problem resulted from the impedance difference is similar to a problem caused from the amplitude difference. Otherwise, if the output impedance is represented as a reactance, the problem caused from the impedance difference is similar to that caused from the phase difference.

In a condition that there is no load coupled to the power system, if the output voltages of two parallel UPS modules have the same amplitudes but a small phase difference (Δθ) is existing between the output voltages, a cross current still can be observed between two parallel UPS modules. The phase of the cross current is different from the phase of the output voltages of the two UPS modules. Thus the two UPS modules are deemed to respectively supply a large reactive power.

The output voltage of individual UPS module (10)(101-10N) is able to be expressed as a vector Therefore, the composed output voltage of the parallel power system can be calculated by summing up these vectors. As an example, if two UPS modules are coupled in parallel and their output voltage phases are different, the amplitude of the composed output voltage is smaller than one amplitude of the two output voltages. In other words, the composed output voltage value is smaller than an expected value that the power system was preset with. Thus, the UPS modules will automatically increase their reference voltage (Vref) to increase the composed output voltage to meet the expected value. However, with the rising of the reference voltage, the reactive power of an individual UPS module is also accordingly increased.

When the parallel power system has the load coupled thereto, the situation is substantially the same as mentioned above, the only difference is that the output current is composed of two parts, a load current and a cross current.

From the foregoing description, the increase of the phase difference also leads to the raising of the cross current and the reactive power. Once the cross current value or the reactive power exceeds the rated value, the parallel power system will probably break down. Therefore, whether in the line voltage operation mode or battery operation mode, the phase difference among all parallel UPS modules should be limited in a tolerable range to ensure the whole system will function well. Thus, all the phases of the output voltage of all the UPS modules should be synchronized (also called as phase lock).

To satisfy the phase locking requirement among the UPS modules, one UPS module is designated to act as the master module while the other UPS modules are slaves. The master UPS module outputs a synchronization signal (as shown in FIGS. 3A-3B, Syn. clock) to phase lock the outputs of other slave UPS modules. Because the internal synchronization signal is generated inside the power system, the PWM switching signal (not shown) of the system can be further required to synchronize this synchronization signal. Therefore, the interference for the current, which is resulted from the un-synchronized PWM signal, is reduced.

Moreover, even when the phases of all output voltages are synchronized, the cross current still exists because the output voltage amplitudes are different among the UPS modules when there is no load coupled to the parallel UPS modules. However, it should be noted that the phase of the cross current is the same as the output voltage of each UPS module. Therefore, an active power interchange (energy interchange) will exist among the UPS modules. The active power interchange is explained in such a way that for two UPS modules, the first UPS module to output the higher voltage is deemed to output the active power, and on the contrary, the other UPS module is deemed to absorb the active power. For a UPS module that outputs the active power, it is equal to that the UPS module is coupled with a load so there is no harmful effect to the USP module. However, for a UPS module that receives active power, once the absorbed active power is greater than the released (output) power of the UPS module, additional energy will be accumulated on a DC bus capacitor inside the UPS module. With the increase of the DC bus voltage, the UPS module then automatically enters a protect mode and automatically interrupts its output voltage supply.

When the power system has the load coupled thereto, there is no harmful effect to each UPS module if its respective output power is greater than the received power. The only problem is that the load current shared among all parallel UPS modules is not equal. However, if such an unbalanced distribution is not solved, a significant repetitive cycle problem occurs. Each UPS module will adjust its reference voltage (Vref) based on the composed output voltage value that is definitely smaller than a highest voltage output from one of the parallel UPS modules. The UPS module supplying the highest voltage would deem the composed output voltage does not reach the expected level, so the UPS module would further raise its reference voltage over and over again. Finally, the reference voltage of the UPS module will reach its maximum value such that this UPS module will supply its full capacity (100%) to the load, and the other UPS modules will absorb the power from this UPS module. As mentioned above, if a UPS module absorbs too much power, the DC bus voltage will increase and lead the UPS module to interrupt its own output voltage.

The difference value between the composed output voltage and each individual output voltage of the UPS modules should firstly be measured whereby the difference value just can be controlled. However, since the composed output voltage is obtained by summing up all vectors that represent the output voltages of the UPS modules, it is not possible to detect the actual difference value. Therefore, the present invention uses a parameter "unbalanced power" to represent the difference between an expected output voltage value and an actual output voltage of a UPS module (as illustrated in FIGS. 3A-3B, the block denoted with unbalanced power calculation).

The unbalanced power parameter is expressed by equation (1):

$$P_{unbal} = \frac{1}{T} \int_T i_e(t) \times v_o(t) dt \qquad (1)$$

$$i_e(t) = i_{load}*(t) - i_{load}(t), \qquad (2)$$

wherein $i_{load}*(t)$ is a current command to determine the ratio of load current sharing. For example, the current command may be proportional to a value derived by dividing the total load current by the number of the parallel UPS modules. Moreover, goad $i_{load}(t)$ represents the detected actual load current of the UPS module and $v_o(t)$ represents the actual output voltage of the UPS module.

When a negative feedback relationship is established between the unbalanced power $P_{unbal}$ and the reference voltage $V_{ref}$ of the UPS module, the problem of unbalanced load sharing and excess voltage in the DC bus resulted from the output voltage difference are able to be mitigated. Such a negative feedback relationship is called "power sharing regulation loop" and expressed as the following equation (3)

$$V_{ref} = V_{setting} + K_1 \times P_{unbal} \qquad (3)$$

wherein $V_{setting}$ is a preset initial voltage for the reference voltage $V_{ref}$ and $K_1$ is the gain value of the power sharing regulation loop.

Actually, because of the DC offset error of the detectors (14) and the quantification error occurred during the A/D sampling process, the $i_{load}^*(t)$ and $i_{Load}(t)$ value may not be zero even when there is only one UPS module being operated to which there is no load coupled. In order to avoid any incorrect adjustment while there is only one UPS module being operated, a dead zone (as shown in FIGS. 3A-3B) is necessary.

When determining the gain value $K_1$, two points should be considered. With the increasing of the gain value $K_1$, the ratio of the load sharing among all parallel UPS modules will accordingly become equal. However, the adjustment accuracy of the output voltage will be sacrificed.

Generally, when the unbalanced power parameter $P_{unbal}$ is applied to adjust the active power interchange among the parallel UPS modules, the effect is satisfactory. However, in some particular situations, for example when the load is suddenly removed from the power system, the gain value $K_1$ is required to be extremely large to ensure the whole power system can be safely operated. Because the output impedance and the response time of each individual UPS module is not identical to the others, and the variation extent of the output voltage of each UPS module is quite large, a large gain value $K_1$ is required to deal with the violent active power interchange among the parallel UPS modules. The adjustment accuracy of the output voltage, however, limits the increase of the gain value $K_1$. Thus, another compensation means should be applied to offset the foregoing unbalanced power parameter in some particular situations.

As mentioned above, when the phases of all parallel UPS modules are synchronized, the absorption of the active power means the energy is gradually accumulated in the DC bus capacitor and results in the raising of the DC bus voltage. Therefore, the present DC bus voltage ($V_{realBUS}$) is compared with a preset normal voltage ($V_{BUSsetting}$) to obtain a different value $\Delta V_{Bus}$ for compensating the active power (as illustrated by the block "Bus compensation" in FIGS. 3A-3B). The compensation is called "DC bus voltage compensation loop" and expressed by the following equations.

$$V_{ref}=V_{setting}+K_2*\Delta V_{BUS} \quad (4)$$

$$\Delta V_{BUS}=V_{realBUS}-V_{BUSsetting}(\Delta V_{BUS}\geqq 0) \quad (5)$$

wherein $V_{setting}$ is a preset initial output voltage value, $K_2$ is a gain value of the DC bus voltage compensation loop, $V_{realBUS}$ is a present detected voltage value of the DC bus, and $V_{BUSsetting}$ is a preset initial voltage of the DC bus.

The DC bus voltage variation is not only influenced by the power output/absorption of the inverter, but is also affected by the power factor corrector (PFC) and voltage boost from the battery. During the transient period (the load is removed from the power system), the overshoot of the bus voltage is unavoidable. Thus another dead zone (as shown in FIGS. 3A-3B) is required.

It should be noted that when there is no load, the power absorption means the voltage level of the DC bus is increased. However, if the power system is coupled to a load, the DC bus voltage compensation loop will function only when the absorbed power is greater than the output power at that time the load is unbalanced. Thus, the power sharing regulation loop functions most of the time, and the DC bus compensation loop only functions in some particular situations.

B. Transient Control of the Parallel Power System:

The above mentioned describes the steady state control of the power system. However in some transient moments, for example, when the load is coupled to or removed from the power system, the power system is unable to immediately respond to the change of the load because the steady state control processing is only executed once per cycle of the output voltage or even longer. That is to say, the steady state control is a low-speed adjustment and is unable to process the transient change in real time.

As shown in FIGS. 3A-3B, the control unit (30) shows the block diagrams related to the transient control. The transient control processing cycle may be equal to the power switching cycle. Except for the current sharing circuit (16) and its related circuits, the circuitry of FIGS. 3A-3B could be deemed as an inverter. In FIGS. 3A-3B, a voltage outer loop is composed of the output voltage detector (14) and a real time voltage control software, and a current inner loop is composed of the inductor current detector and a real time current control software. Generally, both the sampling and processing frequency of the voltage outer loop are substantially the same as that of the current inner loop. Only in some specific situations will the processing frequency of the voltage outer loop be slowed down. The current sharing circuit (16) further comprises a switch element (shown in FIG. 4) that allows the inverter to be independently operated. The inverter can also be isolated simply by switching off the switch element to prevent any influences from surroundings.

The transient performance will cause a great negative effect upon the power system. If a rectifier load is coupled to the power system without the transient control, a large current surge may impact one of the parallel UPS modules and the rate of load sharing that other UPS modules within the system take is small. Moreover, if a UPS module has a distorted output voltage, the cross current resulted from the distorted output voltage is great. To enable the load to be equally shared by all the UPS modules, a real time current control loop (as shown in FIGS. 3A-3B) is established inside the current inner loop to achieve the control of the inverter (11). The considered parameters of the real time current control loop is substantially the same as the parameters of the static control. The considered parameters of the real time current represent the unbalanced current difference of the current sharing (see FIG. 4). However, the sampling frequency and calculating frequency of the real time current control loop is approximately 50us, wherein the calculated error value can be further applied to the current inner loop. The real time current control loop is expressed by:

$$i_{com}(t)=K_{i2}*(i_{avg}(t)-i_{load}(t)) \quad (6)$$

where $i_{com}(t)$ is a compensation current applied to the current inner loop, and $K_{i2}$ is a gain value of the real time current control loop.

Through the proof of the experiment, the real time current control loop is able to immediately balance the transient current, and is also capable of restraining the static cross current caused from the abnormal output voltage and the phase difference. A large gain value $K_{i2}$ is helpful to balance to the transient and static cross currents among the UPS modules. However, if the gain value $K_{i2}$ is too high, the interference from the current sharing circuit (16) may be induced.

Figure 4:
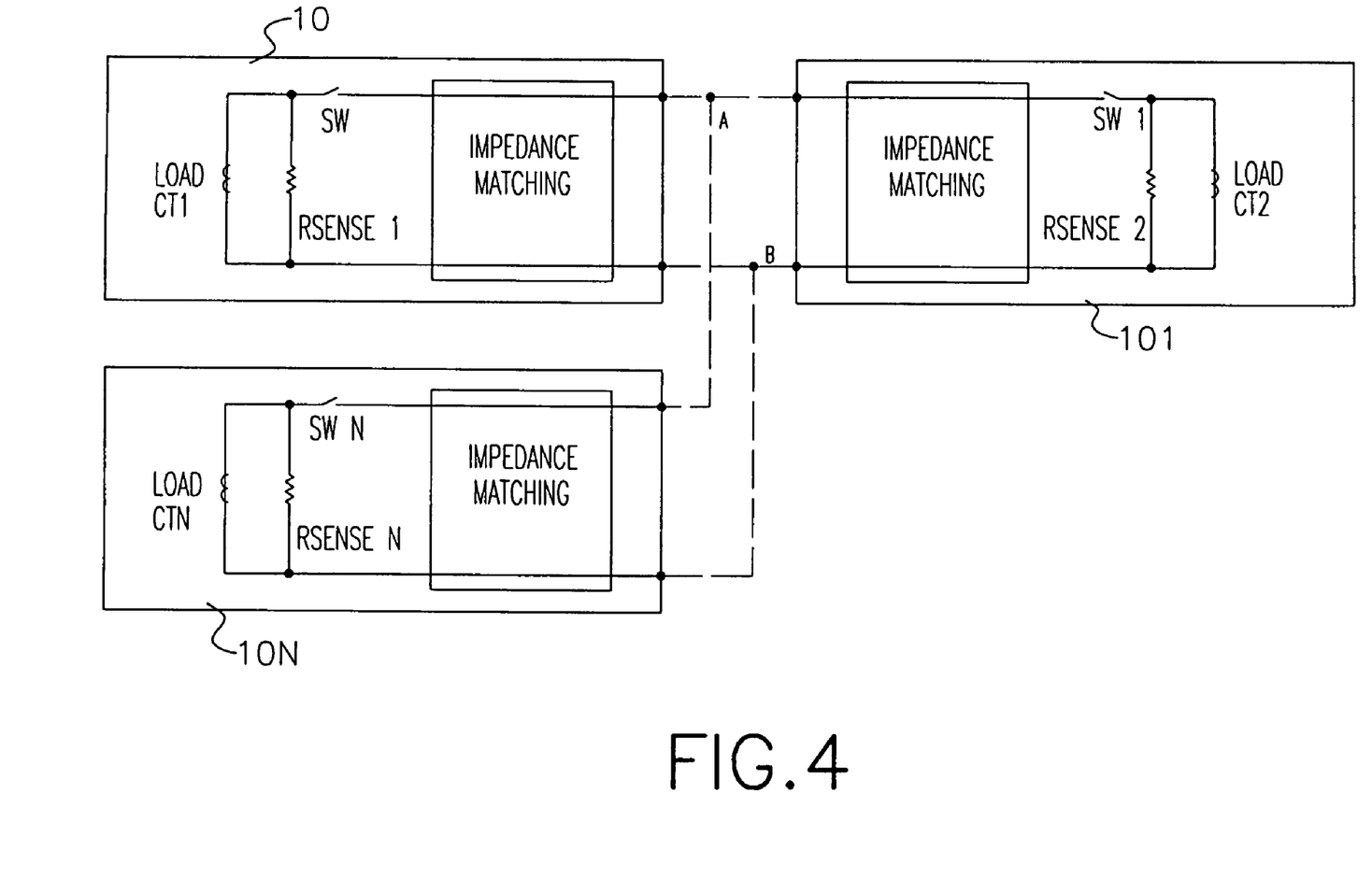
FIG. 4 is a schematic view showing the current sharing among the UPS modules.

As shown in FIG. 4, each UPS module (10)(101)-(10N) further includes a switching element (SW)(SW1)-(SWN). If the switching element is switched off, the respective UPS module (10)(101)-(10N) works as an independent inverter and the control means for the independent inverter is not to be modified.

Figure 5:
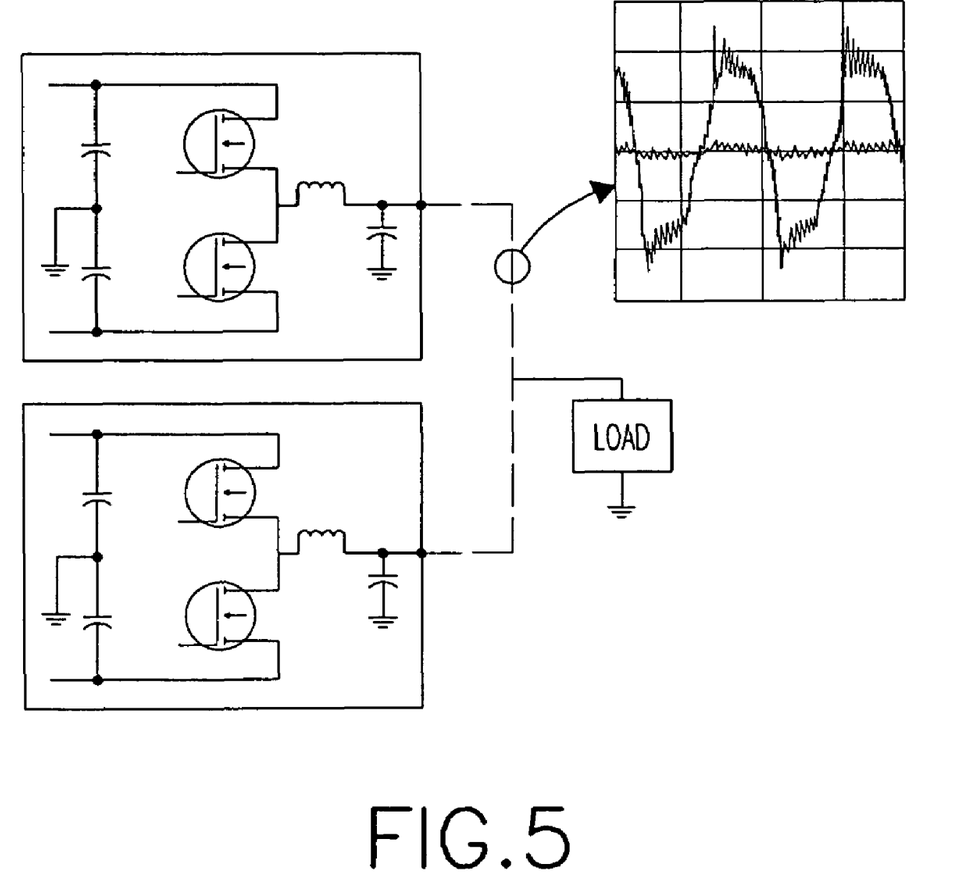
FIG. 5 is a schematic view showing the current limitation in accordance with the present invention.

Another key point to be noted is the limitation for the output current. The purpose of limiting the output current is to protect the inverter from damage resulting from the exceeded output current. With reference to FIG. 5, when the power system is coupled with a rectifier load or a reactance impedance load, or when the load becomes short circuited, the output current limit is activated. Since each UPS module in the power system is not completely identical to the others, the starting time and the duration of the current limit of each individual UPS module is also different to the others. These differences among the UPS modules cause a high frequency share current error signal. When such a share current error signal is added in the current inner loop, the output current has the oscillation problem which may damage the inverter. Therefore, the present invention provides an auto-adaptive current limit control to avoid the oscillation problem.

The auto-adaptive current limit control is explained hereinafter. When the output current value approximately reaches a preset limit value, each UPS module automatically adjusts its gain value of the current inner loop based on the detected real current and the voltage values to allow all the UPS modules to be properly operated. Even when the load becomes short circuited, the gain value $K_{i2}$ and the preset limit value are reduced so that the UPS modules still can output a large current and the inverter is not damaged. Thereby the protective fuse or the breaker of the shorted load is fused or tripped, and the output voltage is recovered.

Through the above-mentioned steady state control and transient control, the cross current value is able to be reduced to lower than 0.4 A when there is no load, and the unbalanced extent of the load current sharing is lower than 1%.

In some specific situations, an unbalanced load current sharing is required. For example, if one UPS module has a lower battery capacity than other UPS modules, the ratio of the current sharing for the said UPS module is correspondingly lower than the other UPS modules so that the operating time of the UPS module can be prolonged. Moreover, for UPS modules with different power capacities, it is preferable to have a direct proportion relationship between the power capacity and the ratio of load sharing that a UPS module can tolerate.

Figure 6:
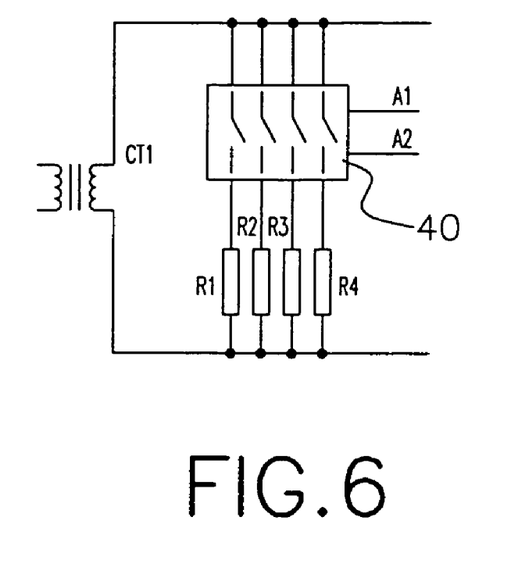
FIG. 6 shows a network composed of resistors for detecting the load current in accordance with the present invention.

In the present invention, the adjustment of the current sharing is based on the share current error signal, wherein the share current error results from the difference between the average current signal and the load current of the UPS module. The generation of the average current is based on the impedance matching of the current sampling circuits among all the UPS modules. If the gains of all the current sampling circuits are equal, and the impedance of all UPS modules are matched, so the load can be equally distributed. If one sampling gain or impedance is not matched, the load can not be equally shared. In such a condition that the impedances are matched, the rate of the load sharing sustained by a UPS module having a low sampling gain is usually larger than the others. In order to satisfy these specific requirements, a resistor network (see FIG. 6) controlled by the software is reserved in the current load sampling circuits. The network is composed of an electrical switching element and some precise resistors R1 to R4. By properly changing the resistance of the network, the gain value of the current sampling circuit is also adjusted. The drawing shows four switching elements with sixteen kinds of impedance provided for choice.

The high reliability of the parallel power system is because many UPS modules are collectively operated to supply power to the load. Such a high reliability is based on the assumption that even when the power system has the problem single point failure, the parallel power system will still work for the load requirement. The single point failure mainly comprises two types. One type is related to the single module failure, for example, the open short, the short circuit, the abnormal output voltage and the frequency of the UPS module etc. The other type concerns the abnormality of the control logic and the failure of the signal circuits, such as the synchronization circuit, the current sharing circuit, the master/slave determination circuit and communication circuit etc. Both types are explained in detail hereinafter.

Type A: The Single Module Failure

The single module failure is the most problematic in the parallel power system and can be further categorized into two types. One type is referred to as non-urgent failure, such as the excess temperature and the DC bus voltage fault. The other type is referred to as urgent failure, which include the problems of open/short circuit and the abnormal output frequency. Since the output voltage and phase of the power system module are not immediately affected by the non-urgent failure, sufficient time exists to solve this kind of problem by interrupting or isolating the failed UPS module. That is to say, a single failed UPS module will not, at least not immediately, affect the other UPS modules. On the contrary, the urgent failure means the abnormal operation of a single UPS module could instantly affect the other UPS modules. The worst situation is the entire power system may break down. Thus, the solving process for the urgent failure usually has higher priority than that of the non-urgent failure. The present invention utilizes several ways to solve the urgent failure.

The first way to settle the urgent failure concerns the current share protection, wherein when the share current error among the UPS modules is greater than a preset value, the protection is activated.

The second way manner of the phase protection is when the phase difference between the actual output voltage of a UPS module and a reference voltage is greater than a preset quantity, whereby the protection is activated. For example, if the phase of the output voltage of a UPS module significantly differs from that of the other UPS modules, the cited UPS module has a larger share current error than those of the other UPS modules. Once the share current error exceeds a limit value, the UPS module sends a protecting command and interrupts its output voltage to isolate itself from the other UPS modules whereby the protection is achieved.

If the above protection means fails to work or experiences other irregular situations, for example there are only two parallel UPS modules so the share current errors of the two UPS modules are equal, the control unit (30) will still monitor the phase difference quantity between the actual output voltage and a reference voltage. If the phase difference exceeds a preset value, the protection is activated.

Figure 7:
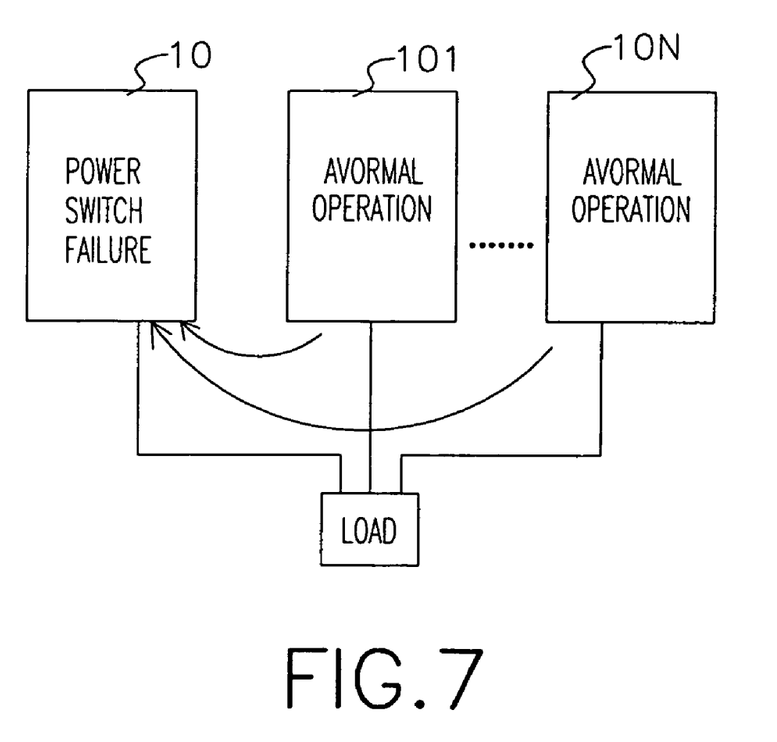
FIG. 7 is schematic view showing the power switch has failed.
Figure 8:
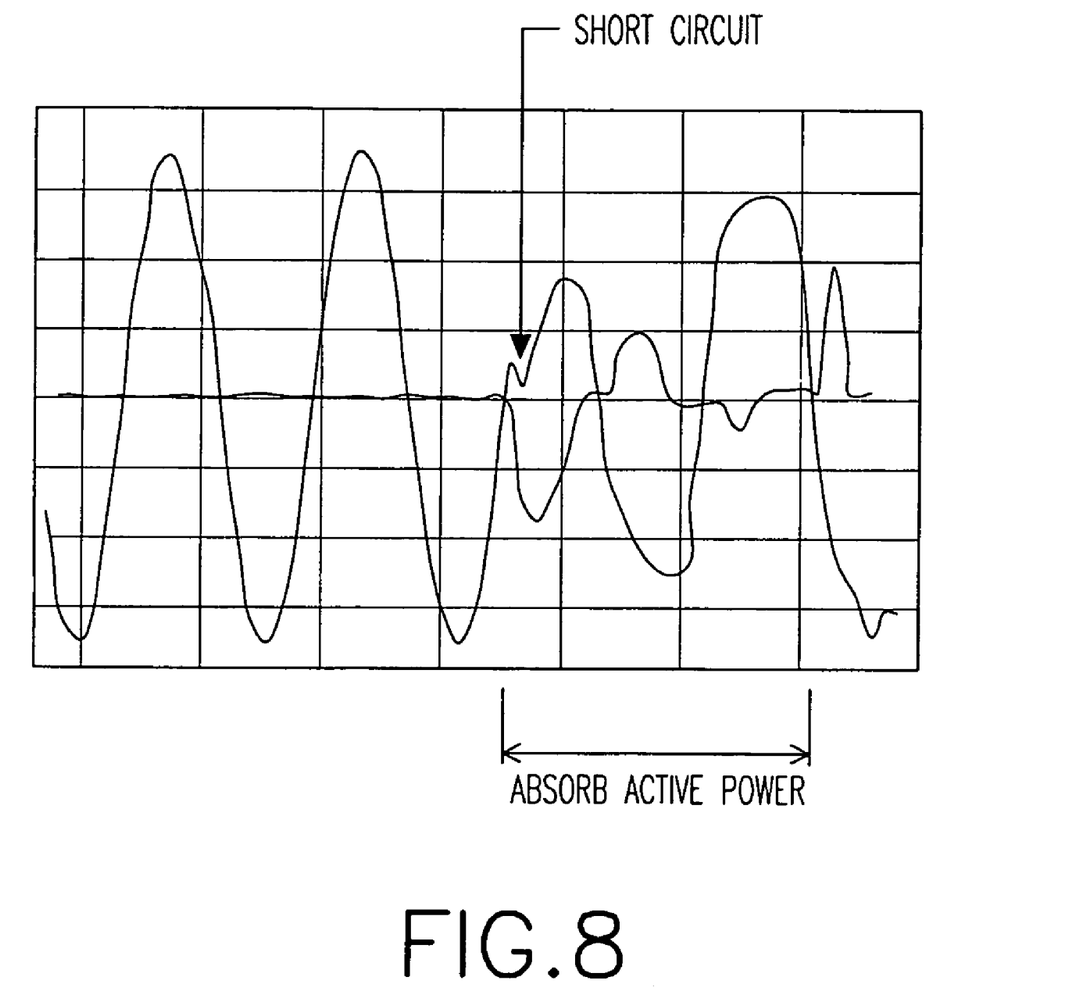
FIG. 8 shows the curve of the negative power protection while the power switch is in the failure status.

According to the statistics data related to the single module failure (especially specifying the inverters), the power switch of the inverter is the element that most commonly fails. Further, other types of failure in the inverter will ultimately lead to damage of the power switch. Once the power switch has failed, the problem of circuit short occurs. Therefore, how to identify a failed inverter (UPS Module) with a defective power switch, and isolate it from other ones is the most important issue to be addressed. Meanwhile, while isolating the defective power switch, the output voltages of the other UPS modules should not be influenced and the power providing to the load must not be interrupted. When the power switch is short, the DC bus of the UPS module firstly becomes short so the voltage level of the DC bus is accordingly lowered. Then, a large sink current from the output bus flows to the defective UPS module, which represents the defective UPS module is absorbing the power from the power system, as shown in FIGS. 7 and 8. For each of the other UPS modules (101)-(10N), a significant increase occurs in the output power. Since each UPS module (101)-(10N) has the over-current protection, the power system can remain in its safe mode for a short period (approximate 20-40 ms), and the voltage supplied to the load is not interrupted.

Therefore, by determining if the absorbed power of a UPS module has exceeded a limit value where only a cycle time is enough for accomplishing the determination, whether any failure or defect arises from the power switch can be identified. Thus the present invention discloses an active power absorption protection (also referred to as negative power protection). The advantage of the negative power protection is that any external information is not necessary and only the quantity of the absorbed power by a UPS module is calculated. Moreover, the negative power protection has a superior capability for anti-interference because the calculating process of the absorbed power itself is a noise filtering process as its essence is a kind of area integral during a period. When the power switches of the inverter fail, because the power absorption is significant and easily observed, the negative power protection can be instantly activated, wherein the required time for response is less than two cycles. Furthermore, the negative power protection can also be applied in other conditions, for example, as in the malfunction of the power system resulting from the un-synchronized phase.

The above mentioned three kinds of protection—the current share protection, the phase protection and the negative power protection—are all provided in the power system. When any one of the three protections is activated, the failed UPS module is isolated.

Type B: The Abnormality of the Control Logic and the Failure of the Signal Circuits In order to monitor the entire parallel power system and to provide the real time information about each UPS module to the user, it is necessary to gather the operating parameters of each UPS module. Such a gathering task is performed by the communication protocols. However, the logic operation of the protocols or the communication hardware may have errors that could result in some serious problems. Further, it should be noted that the communication line is generally designed without an alternative source. To avoid the foregoing errors, several ways described hereinafter are useful.

One way is to detect the communicated information, wherein some key control logic is monitored by software. Another way is to execute a failure monitoring process to check each communication circuit and the synchronizing circuit. When the communication signal or the synchronizing signal has not been received by the UPS module, the communication circuit or the synchronizing circuit connected with the UPS module is deemed as a failed circuit. Further, the operation of the communication circuit is upon a normal operating voltage. For example, when the operating voltage of the communication circuit is in the normal range such as 15±3V, the input voltage level of the communication circuit of UPS module is opposite to the output voltage level. However, if the operating voltage is abnormal, the input and output voltage level will become the same or very close to each other, so that the abnormal operating voltage is detected.

From the foregoing description, the present invention presents a redundant parallel control system including a communication protocol for assigning a dynamic master UPS module, and being capable of determining the rate of the load sharing among the UPS modules. The advantages of the system can be concluded as follows.

1. The present invention establishes a parallel redundant power system composed of UPS modules, wherein the system is capable of adjusting the transient gain value of the control unit when the UPS modules have the problem of over current, non-linear load or circuit short. Further, by using the power balance concept and concerning the output impedance, the cross current needs not be divided into two vectors.

2. Since the current sharing circuit further comprises a switch element, a single inverter can be operated independently.

3. The synchronization signal applied to the power system can be from an external controller, or from any one of the parallel UPS modules whereby once the external controller has failed, the entire power system still can be operated normally.

The foregoing description of the preferred embodiments of the present invention is intended to be illustrative only and, under no circumstances, should the scope of the present invention be so restricted.

What is claimed is:

1. A load sharing control method by using an unbalanced power to adjust active power, the method applying for a power system composed of at least two inverters coupled in parallel to provide AC power to a load through a bus, the method comprising the steps of:

sampling an output voltage $v_o(t)$, a load current $i_{load}(t)$, and a current sharing command $i_{load}^*(t)$ generated from a current sharing circuit;

calculating a difference value $i_e(t)$ by comparing the sampled load current with the sampled current sharing command, wherein the difference value is expressed by $i_e(t)=i_{load}^*(t)-i_{load}(t)$;

integrating the product of the difference value $i_e(t)$ and the output voltage $v_o(t)$ during an output voltage cycle T, and then calculating an unbalanced power $P_{unbal}$ according to an equation $$P_{unbal} = \frac{1}{T}\int_T i_e(t) \times v_o(t)dt;$$

establishing a relationship between the unbalanced power $P_{unbal}$ and a reference voltage $V_{ref}$, wherein the relationship is expressed by an equation $V_{ref}=V_{setting}+K_1 \times P_{unbal}$, and $V_{setting}$ is a preset initial voltage of the reference voltage $V_{ref}$ and $K_1$ is a gain value that is inversely proportional to the difference value $i_e(t)$; and adjusting the output voltage $v_o(t)$ of the inverter based on the unbalanced ∞power $P_{unbal}$.

2. The method as claimed in claim 1, wherein the unbalanced power is generated when the amplitude of the output voltages, the output impedance, or the phases of the output voltages of the at least two inverters are different to each other.

* * * * *